(12) United States Patent
Murata

(10) Patent No.: US 8,652,979 B2
(45) Date of Patent: Feb. 18, 2014

(54) TEMPERED GLASS SUBSTRATE

(75) Inventor: Takashi Murata, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 488 days.

(21) Appl. No.: 12/311,741

(22) PCT Filed: Oct. 10, 2007

(86) PCT No.: PCT/JP2007/069727
§ 371 (c)(1),
(2), (4) Date: Apr. 10, 2009

(87) PCT Pub. No.: WO2008/044694
PCT Pub. Date: Apr. 17, 2008

(65) Prior Publication Data
US 2010/0035745 A1    Feb. 11, 2010

(30) Foreign Application Priority Data

Oct. 10, 2006   (JP) .................. 2006-276510

(51) Int. Cl.
C03C 3/083    (2006.01)
C03C 21/00    (2006.01)
C03C 3/085    (2006.01)
B32B 17/00    (2006.01)

(52) U.S. Cl.
USPC ............... 501/68; 501/69; 428/409; 428/410

(58) Field of Classification Search
USPC ........... 501/66, 68, 69, 70; 428/409, 410, 192
See application file for complete search history.

(56) References Cited

U.S. PATENT DOCUMENTS

| | | | |
|---|---|---|---|
| 5,972,460 A | 10/1999 | Tachiwana | |
| 6,251,812 B1 * | 6/2001 | Koyama et al. ............. | 501/69 |
| 6,306,786 B1 * | 10/2001 | Koyama et al. ............. | 501/69 |
| 6,340,647 B1 * | 1/2002 | Koyama et al. ............. | 501/69 |
| 6,518,211 B1 * | 2/2003 | Bradshaw et al. ............ | 501/69 |
| 6,576,353 B1 * | 6/2003 | Mitani et al. ............... | 428/846.9 |
| 6,818,576 B2 * | 11/2004 | Ikenishi et al. ............. | 501/65 |
| 7,666,511 B2 * | 2/2010 | Ellison et al. ............... | 428/426 |
| 2001/0049327 A1 | 12/2001 | Hachitani | |
| 2003/0110803 A1 * | 6/2003 | Saito et al. ............... | 65/30.14 |
| 2003/0220183 A1 * | 11/2003 | Kurachi et al. ............. | 501/70 |
| 2004/0242396 A1 | 12/2004 | Hachitani | |
| 2005/0013972 A1 * | 1/2005 | Kusabiraki et al. .......... | 428/141 |
| 2005/0090377 A1 * | 4/2005 | Shelestak et al. ........... | 501/69 |
| 2005/0096210 A1 * | 5/2005 | Kawai ........................ | 501/69 |
| 2005/0250639 A1 * | 11/2005 | Siebers et al. .............. | 501/68 |
| 2006/0063009 A1 | 3/2006 | Naitou et al. | |
| 2007/0060465 A1 * | 3/2007 | Varshneya et al. ........... | 501/68 |
| 2011/0014475 A1 * | 1/2011 | Murata ....................... | 428/410 |

FOREIGN PATENT DOCUMENTS

| | | |
|---|---|---|
| JP | 11-232627 | 8/1999 |
| JP | 2002-174810 | 6/2002 |
| JP | 2002-278701 | 9/2002 |
| JP | 2003-212591 | 7/2003 |
| JP | 2004-99370 | 4/2004 |
| JP | 2006-83045 | 3/2006 |
| KR | 2001-0082735 | 8/2001 |

OTHER PUBLICATIONS

Machine Translation of JP 2002-174810, Jun. 21, 2002.*
Supplementary European Search Report dated Sep. 29, 2010 in corresponding European Patent Application No. 07829465.
International Search Report dated Dec. 18, 2007 in the International (PCT) Application PCT/JP2007/069727 of which the present application is the U.S. National Stage.
International Preliminary Report on Patentability and English translation of PCT Written Opinion mailed Apr. 30, 2009 for International (PCT) Application No. PCT/JP2007/069727 of which the present application is the U.S. National Stage.
Tetsuro Izumitani et al., "New glass and physicality thereof", First edition, Management System Laboratory Co., Ltd., pp. 451-498, Aug. 1984.

* cited by examiner

*Primary Examiner* — Karl Group
*Assistant Examiner* — Elizabeth A Bolden
(74) *Attorney, Agent, or Firm* — Wenderoth, Lind & Ponack, L.L.P.

(57) ABSTRACT

Provided is a glass substrate satisfying ion exchange performance and devitrification resistance of a glass simultaneously and having higher mechanical strength compared to a conventional glass substrate. A tempered glass substrate which has a compression stress layer on a surface thereof, has a glass composition including, in terms of mole %, 50 to 85% of $SiO_2$, 5 to 30% of $Al_2O_3$, 0 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, and is substantially free of $As_2O_3$ and F.

30 Claims, No Drawings

TEMPERED GLASS SUBSTRATE

TECHNICAL FIELD

The present invention relates to a tempered glass substrate, and particularly, to a tempered glass substrate suitable for cellular phones, digital cameras, personal digital assistance (PDA), or touch panel displays.

BACKGROUND ART

Devices such as cellular phones, digital cameras, PDA, or touch panel displays show a tendency of further prevalence.

Glass substrates used in those applications are required to have high mechanical strength. Conventionally, glass substrates tempered by ion exchange and the like (so-called tempered glass substrate) are used in those applications (see Patent Document 1, Non-patent Document 1).

Patent Document 1: JP 2006-83045 A

Non-patent Document 1: Tetsuro Izumitani et al., "New glass and physicality thereof", First edition, Management System Laboratory. Co., Ltd., 20 Aug. 1984, p 451-498

DISCLOSURE OF THE INVENTION

Problems to be solved by the Invention

Non-patent document 1 describes that when the content of $Al_2O_3$ in the glass composition is increased, the ion exchange performance of the glass increases and the mechanical strength of the glass substrate can be improved.

However, when the content of $Al_2O_3$ in the glass composition is further increased, the devitrification resistance of the glass deteriorates, the glass tends to be devitrified in forming, and the production efficiency, quality, and the like of the glass substrate becomes worse. When the devitrification resistance of the glass is poor, forming methods such as an overflow down-draw method cannot be employed, and the surface precision of the glass substrate cannot be enhanced. Therefore, after forming of the glass substrate, a polishing process should be additionally performed separately. When the glass substrate is polished, small defects tend to be generated on the surface of the glass substrate, and it becomes difficult to maintain the mechanical strength of the glass substrate.

In view of the above circumstances, it is difficult to attain the ion exchange performance and the devitrification resistance of a glass simultaneously, and it is difficult to remarkably improve the mechanical strength of the glass substrate.

For reducing the weight of a device, glass substrates used in devices such as touch panel displays are reduced in thickness year by year. Because a glass substrate with small thickness is easily broken, technologies for improving the mechanical strength of the glass substrate are becoming more important.

Thus, it is a technical object of the present invention to obtain a glass substrate satisfying the ion exchange performance and the devitrification resistance of a glass simultaneously, and having higher mechanical strength compared to the conventional glass substrate.

Means for Solving the Problems

The inventors of the present invention have conducted various studies and resultantly found that a high ion exchange performance is expressed by including $TiO_2$ in the glass composition. Also, it has been found that when the suitable content of $Al_2O_3$ is determined, and then the total content of $Al_2O_3$ and alkali metal oxides is optimized and the molar ratio (mole fraction) of $Al_2O_3$ and alkali metal oxides is optimized, the devitrification resistance of the glass can be improved without losing an ion exchange performance, and thus, leading to proposal of the present invention. That is, a tempered glass substrate of the present invention has a compression stress layer on a surface thereof, in which the tempered glass substrate has a glass composition including, in terms of mole %, 50 to 85% of $SiO_2$, 5 to 30% of $Al_2O_3$, 0 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, and is substantially free of $As_2O_3$ and F.

Second, the tempered glass substrate of the present invention has a glass composition including, in terms of mole %, 50 to 85% of $SiO_2$, 5 to 12.5% of $Al_2O_3$, 0 to 7% of $B_2O_3$, 0 to 9% of $Li_2O$, 7 to 20% of $Na_2O$, 0 to 20% of $K_2O$, 0.001 to 8% of $TiO_2$, and 15 to 35% of $Li_2O+Na_2O+K_2O+Al_2O_3$, has a $(Li_2O+Na_2O+K_2O)/Al_2O_3$ value of 0.7 to 2.7 and a $(MgO+CaO)/Al_2O_3$ value of 0 to 0.55 in terms of mole fraction, and is substantially free of $As_2O_3$ and F.

Third, the tempered glass substrate of the present invention has a compression stress layer on a surface thereof, in which the tempered glass substrate has a glass composition including, in terms of mole %, 50 to 85% of $SiO_2$, 5 to 30% of $Al_2O_3$, 0 to 7% of $B_2O_3$, 0.5 to 20% of $Li_2O$, 0 to 20% of $Na_2O$, 0 to 20% of $K_2O$, 0.001 to 20% of $TiO_2$, and 15 to 35% of $Li_2O+Na_2O+K_2O+Al_2O_3$, and has a $(Li_2O+Na_2O+K_2O)/Al_2O_3$ value of 0.7 to 3 in terms of mole fraction.

Fourth, the tempered glass substrate of the present invention has a glass composition including, in terms of mole %, 50 to 85% of $SiO_2$, 5 to 12.5% of $Al_2O_3$, 0 to 7% of $B_2O_3$, 0.5 to 10% of $Li_2O$, 0 to 20% of $Na_2O$, 0 to 20% of $K_2O$, 0.01 to 10% of $TiO_2$, and 15 to 28.5% of $Li_2O+Na_2O+K_2O+Al_2O_3$, and has a $(Li_2O+Na_2O+K_2O)/Al_2O_3$ value of 0.7 to 2.7 in terms of mole fraction.

Fifth, the tempered glass substrate of the present invention has a compression stress of the surface of 100 MPa or more and a depth of the compression stress layer of 1 μm or more. Here, "compression stress of surface" and "depth of compression stress layer" denote values calculated from the number of interference stripes and clearance thereof obtained in observing a sample using a surface stress meter (FSM-6000 manufactured by Toshiba Corporation). Note that in calculation, the refractive index was set to 1.52 and the photoelastic constant was set to 28 [(nm/cm)/MPa].

Sixth, the tempered glass substrate of the present invention has an unpolished surface.

Seventh, the tempered glass substrate of the present invention is formed by an overflow down-draw method.

Eighth, the tempered glass substrate of the present invention has a liquidus temperature of 1300° C. or lower. Here, a glass is ground, and a glass powder passing through a standard sieve of 30 mesh (mesh opening 500 μm) and remaining on 50 mesh (mesh opening 300 μm) is placed in a platinum boat, kept in a temperature gradient furnace for 24 hours, then, the crystal thereof deposits, the temperature at this stage is referred to as "liquidus temperature".

Ninth, the tempered glass substrate of the present invention has a liquidus viscosity of $10^{4.0}$ dPa·s or more. Here, "liquidus viscosity" denote the viscosity of a glass at the liquidus temperature. When the liquidus temperature is lower and the liquidus viscosity is higher, the devitrification resistance of the glass is more excellent and formability of the glass substrate is more excellent.

Tenth, the tempered glass substrate of the present invention has a density of 2.8 g/cm³ or less. Here, "density" denotes a value measured by a known Archimedes method.

Eleventh, the tempered glass substrate of the present invention has a Young's modulus of 68 GPa or more. Here, "Young's modulus" denotes a value measured by a resonance method.

Twelfth, the tempered glass substrate of the present invention has a thermal expansion coefficient at 30 to 380° C. of 40 to $95 \times 10^{-7}$/° C. Here, "thermal expansion coefficient" denotes a value of an average thermal expansion coefficient in the temperature range of 30 to 380° C. using a dilatometer.

Thirteenth, the tempered glass substrate of the present invention has a crack generation ratio of 60% or less. Here, "crack generation ratio" denotes a value measured as described below. First, in a constant-temperature constant-humidity chamber kept at a humidity of 30% and a temperature of 25° C., a Vickers indenter set at a load of 500 g is allowed to beat the glass surface (optically polished surface) for 15 seconds, and after 15 seconds, the number of cracks generated from four corners of the impression is counted (at maximum 4 for one impression). The indenter is allowed to beat 20 times as described above, and the total crack generation number is determined, then, the crack generation ratio is calculated by the formula: (total crack generation number/80)×100.

Fourteenth, the tempered glass substrate of the present invention is used as a touch panel display.

Fifteenth, the glass of the present invention has a glass composition including, in terms of mole %, 50 to 85% of $SiO_2$, 5 to 30% of $Al_2O_3$, 0 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, and is substantially free of $As_2O_3$ and F.

Sixteenth, the glass of the present invention has a glass composition including, in terms of mole %, 50 to 85% of $SiO_2$, 5 to 30% of $Al_2O_3$, 0 to 7% of $B_2O_3$, 0.5 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, and has a $(Li_2O+Na_2O+K_2O)/Al_2O_3$ value of 0.7 to 3 in terms of mole fraction.

Seventeenth, the glass of the present invention has, when ion exchange is carried out in a $KNO_3$ molten salt at 430° C. for 4 hours, a compression stress of a surface of 200 MPa or more and a depth of compression stress layer of 3 μm or more. Here, "compression stress of surface" and "depth of compression stress layer" denote values calculated from the number of interference stripes and clearance thereof obtained in observing a sample using a surface stress meter (FSM-60 manufactured by Toshiba Corporation).

Eighteenth, the tempered glass of the present invention has a glass composition including, in terms of mole %, 50 to 85% of $SiO_2$, 5 to 30% of $Al_2O_3$, 0 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, is substantially free of $As_2O_3$ and F, and has a compression stress layer formed on a surface thereof.

Nineteenth, the tempered glass of the present invention has a glass composition including, in terms of mole %, 50 to 85% of $SiO_2$, 5 to 30% of $Al_2O_3$, 0 to 7% of $B_2O_3$, 0.5 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, and has a compression stress layer formed on a surface.

BEST MODE FOR CARRYING OUT THE INVENTION

The tempered glass substrate of the present invention has a compression stress layer on a surface thereof. The method of forming the compression stress layer on the surface of a glass substrate includes a physical tempering method and a chemical tempering method. For the tempered glass substrate of the present invention, a compression stress layer is formed preferably by a chemical tempering method. The chemical tempering method is a method of introducing alkali ions having large ion radius onto the surface of a glass substrate by ion exchange at a temperature lower than a strain point of the glass. When a compression stress layer is formed by the chemical tempering method, the tempering treatment can be performed successfully even if the plate thickness of the glass substrate is small, and desired mechanical strength can be obtained. Further, when a compression stress layer is formed by the chemical tempering method, the glass substrate is not broken easily even if the glass substrate is cut after the formation of the compression stress layer on the glass substrate, which is different from the case of a physical tempering method such as an air cooling tempering method.

The conditions for ion exchange are not particularly limited, and may be determined in view of the viscosity property and the like of a glass. In particular, when $K_2O$ in a $KNO_3$ molten salt is ion-exchanged for a $Li_2O$ and $Na_2O$ component in a glass substrate, a compression stress layer can be formed efficiently on the surface of the glass substrate.

The reason for limiting the glass composition to the above-mentioned range in the tempered glass substrate of the present invention is illustrated below. Note that, unless otherwise mentioned, "%" means "mol %".

$SiO_2$ is a component forming a network of a glass, and content thereof is 50 to 85%, preferably 53 to 78%, more preferably 55 to 75%, and still more preferably 58 to 70%. When the content of $SiO_2$ is larger than 85%, melting and forming of the glass become difficult, the thermal expansion coefficient becomes too low, and matching of the thermal expansion coefficient with those of peripheral materials becomes difficult. On the other hand, when the content of $SiO_2$ is smaller than 50%, the thermal expansion coefficient of the glass becomes too high, and the thermal shock resistance of the glass tends to lower. Further, when the content of $SiO_2$ is smaller than 50%, it becomes difficult to be vitrified, and the devitrification resistance of the glass tends to deteriorate.

$Al_2O_3$ is a component having the effect of enhancing the heat resistance, ion exchange performance, and Young's modulus of a glass, and the content thereof is 5 to 30%. When the content of $Al_2O_3$ is more than 30%, a devitrified crystal tends to deposit in the glass, and the thermal expansion coefficient of the glass becomes too low, thus, matching of the thermal expansion coefficient with those of peripheral materials becomes difficult. Further, the high temperature viscosity may also be increased, to deteriorate the meltability. When the content of $Al_2O_3$ is smaller than 5%, there occurs a possibility that a sufficient ion exchange performance cannot be exerted. From the above-mentioned viewpoints, the upper limit of the suitable range of $Al_2O_3$ is 20% or less, 16% or less, 12.5% or less, 11% or less, or 10% or less, and particularly 9% or less, and the lower limit thereof is 5.5% or more or 6% or more, and particularly 7% or more.

$B_2O_3$ is a component having an effect of lowering the liquidus temperature, high temperature viscosity, and density of a glass and having an effect of improving the Young's modulus and the ion exchange performance of the glass. The content of $B_2O_3$ is 0 to 7%, preferably 0 to 5%, more preferably 0 to 3%, and still more preferably 0 to 1%. When the content of $B_2O_3$ is more than 7%, a weathering may generate on the surface by an ion exchange, water resistance of the glass may be impaired, and low temperature viscosity may be lowered too much, or liquidus viscosity may be lowered.

$TiO_2$ is a component having an effect of improving the ion exchange performance and an effect of improving mechanical strength of a glass substrate. Thus, $TiO_2$ is an essential component in the present invention. In addition, $TiO_2$ has an effect of raising low temperature viscosity and an effect of lowering high temperature viscosity. That is, $TiO_2$ is a component which makes the viscosity of a glass short and enables easy formation of a glass substrate having a high surface precision by an overflow downdraw method. Further, $TiO_2$ has an effect of improving long-term stability of the molten salt used in the ion exchange. However, when the content of $TiO_2$ is too large, the glass is easily devitrified and colored. Therefore, it is preferred that the content of $TiO_2$ be 0.001 to 10%, preferably 0.01% to 8%, more preferably 0.5% to 5%, or still more preferably 1 to 5%. Note that as a $TiO_2$ introduction source, $TiO_2$ raw material may be used and it is not problematic that $TiO_2$ may be introduced from a trace component contained in a silica sand and the like.

$Li_2O$ is an ion exchange component, which also lowers the high temperature viscosity of a glass to improve the meltability and the formability. Further, $Li_2O$ is a component having an effect of improving the Young's modulus of a glass, and an effect of reducing the crack generation ratio. The content of $Li_2O$ is 0 to 20%, preferably 0 to 10%, more preferably 0.1 to 9%, and still more preferably 0.5 to 8%. When the content of $Li_2O$ is more than 20%, the glass tends to be devitrified, the liquidus viscosity lowers, and in addition, the thermal expansion coefficient of the glass increases too much, and hence, the thermal shock resistance of the glass lowers and matching of the thermal expansion coefficient with those of peripheral materials becomes difficult. Further, the strain point lowers too much, and hence, the heat resistance deteriorates, and the ion exchange performance deteriorates adversely in some cases.

$Na_2O$ is an ion exchange component, which also has an effect of lowering the high temperature viscosity of a glass to improve the meltability and the formability thereof and an effect of lowering the crack generation ratio. Further, $Na_2O$ is also a component improving the devitrification resistance of the glass. The content of $Na_2O$ is 0 to 20%, preferably 7 to 20%, and more preferably 7 to 18%. When the content of $Na_2O$ is larger than 20%, the thermal expansion coefficient of the glass becomes too high, and hence, the thermal shock resistance of the glass lowers, and matching of the thermal expansion coefficient with those of peripheral materials becomes difficult. In addition, when the content of $Na_2O$ is too large, a balance of the glass composition is lacking, thereby deteriorating the devitrification resistance of the glass. Further, when the content of $Na_2O$ is larger than 20%, the strain point lowers too much, and thermal resistance may deteriorate and the ion exchange performance may deteriorate.

$K_2O$ has an effect of promoting ion exchange, and also has an effect of lowering high temperature viscosity of a glass to enhance the meltability and the formability and an effect of lowering the crack generation ratio. $K_2O$ is also a component improving devitrification resistance. The content of $K_2O$ is 0 to 20%, preferably 0.5 to 10%, more preferably 0.5 to 8%, still more preferably 1 to 6%, particularly preferably 1 to 5%, and most preferably 2 to 4%. When the content of $K_2O$ is larger than 20%, the thermal expansion coefficient of the glass becomes too high, and hence, the thermal shock resistance of the glass lowers and matching of the thermal expansion coefficient with those of peripheral materials becomes difficult. Further, when the content of $K_2O$ is too large, a balance of the glass composition is lacking and the devitrification resistance of the glass tends to deteriorate.

For satisfying high liquidus viscosity and ion exchange performance simultaneously in the tempered glass substrate of the present invention, it is important to regulate the content of $Na_2O+K_2O+Li_2O+Al_2O_3$ and the value of the mole fraction $(Li_2O+Na_2O+K_2O)/Al_2O_3$. Further, when the value of the mole fraction $(MgO+CaO)/Al_2O_3$ and/or the value of the mole fraction $Li_2O/(Li_2O+Na_2O+K_2O)$ is regulated in the tempered glass substrate of the present invention, the liquidus viscosity and the ion exchange performance can be satisfied at higher level simultaneously.

When the total content of alkali metal components $R_2O$ (R represents one kind or more selected from Li, Na and K, that is, $R_2O=Li_2O+Na_2O+K_2O$) and $Al_2O_3$ is too large, the glass tends to be devitrified, and in addition, the thermal expansion coefficient increases too much, and hence, the thermal shock resistance of the glass lowers and matching of the thermal expansion coefficient with those of peripheral materials becomes difficult. Further, the strain point lowers too much in some cases. Therefore, it is desirable that the total amount of these components be 35% or less, 30% or less, or 29% or less, and particularly 28.5% or less. On the other hand, when the total content of $R_2O+Al_2O_3$ is too small, the ion exchange performance and the meltability of a glass tend to deteriorate. Therefore, it is desirable that the total content of those components be 15% or more, 17% or more, 19% or more, or 20% or more, and particularly 22% or more.

By regulating the total content of $R_2O+Al_2O_3$ in the above-mentioned range, and additionally regulating the value of the mole fraction $R_2O/Al_2O_3$ to 0.7 to 3, a glass having high liquidus viscosity and high ion exchange performance can be obtained more effectively. By setting the value of the mole fraction $R_2O/Al_2O_3$ to 0.7 or more (preferably 1 or more, 1.5 or more, 1.7 or more, or 1.8 or more, and particularly 1.9 or more), the liquidus temperature lowers, a glass having high liquidus viscosity is obtained easily, and the meltability of the glass is improved. As a result, forming by an overflow downdraw method is easily carried out. However, when the value of the mole fraction $R_2O/Al_2O_3$ is too large, the ion exchange performance of a glass tends to deteriorate. Further, when the value of the mole fraction $R_2O/Al_2O_3$ is too large, the strain point of the glass lowers, and hence, the thermal shock resistance deteriorates, the thermal expansion coefficient increases too much, and matching of the thermal expansion coefficient with those of peripheral materials becomes difficult. Therefore, it is preferred that the value of the mole fraction $R_2O/Al_2O_3$ is 3 or less, 2.8 or less, 2.7 or less, 2.5 or less, 2.4 or less, 2.3 or less, or 2.2 or less, and particularly 2.1 or less.

By regulating the value of the mole fraction $(MgO+CaO)/Al_2O_3$ in the range of 0 to 0.55, the ion exchange performance and the devitrification resistance can be easily satisfied at higher level simultaneously. When the value of $(MgO+CaO)/Al_2O_3$ is more than 0.55, there are tendencies that the density and thermal expansion coefficient increase and the devitrification resistance deteriorates.

In addition, in the tempered glass substrate of the present invention, the value of the mole fraction $Li_2O/(Li_2O+Na_2O+K_2O)$, the value of the mole fraction $Na_2O/(Li_2O+Na_2O+K_2O)$, and the value of the mole fraction $K_2O/(Li_2O+Na_2O+K_2O)$ are modified, whereby properties of the glass, such as the thermal expansion coefficient, Young's modulus, ion exchange performance, and devitrification, and crack generation ratio, can be adjusted. In particular, the value of the mole fraction $Li_2O/(Li_2O+Na_2O+K_2O)$ influences largely on properties such as the Young's modulus, devitrification, ion exchange performance, and crack generation ratio. When the value of the mole fraction $Li_2O/(Li_2O+Na_2O+K_2O)$ is large, there is a tendency that the Young's modulus becomes high or the crack generation ratio lowers. Because the devitrification resistance deteriorates and the liquidus viscosity lowers, the value of the mole fraction $Li_2O/(Li_2O+Na_2O+K_2O)$ is preferably 0.7 or less and particularly preferably 0.6 or less. Further, in order to improve the devitrification resistance of the glass, the value of the mole fraction $Na_2O/(Li_2O+Na_2O+K_2O)$ is preferably 0.3 to 1, more preferably 0.4 to 1, and particularly preferably 0.5 to 1. Further, the value of the mole fraction $K_2O/(Li_2O+Na_2O+K_2O)$ is regulated to preferably 0 to 0.5, more preferably 0 to 0.4, and still more preferably 0 to 0.3.

In the tempered glass substrate of the present invention, as the glass composition, components such as ZnO, MgO, CaO, SrO, BaO, $P_2O_5$, and $ZrO_2$, in addition to the above components may be added. Note that the components such as ZnO, MgO, CaO, SrO, BaO, $P_2O_5$, and $ZrO_2$ are arbitrary components.

ZnO is a component having an effect of remarkably improving the ion exchange performance when added in a suitable amount into the glass system according to the present invention. Further, ZnO is a component having an effect of lowering the high temperature viscosity of the glass, and improving the Young's modulus. The content of ZnO is 0 to 15%, preferably 0 to 12%, more preferably 0 to 10%, still more preferably 0.01 to 8%, and most preferably 0.5 to 6%. When the content of ZnO is more than 15%, the thermal expansion coefficient of the glass becomes too high, and in addition, there are tendencies that the devitrification resistance of the glass deteriorates and the crack generation ratio increases.

Alkaline earth metal components R'O (R' represents one kind or more selected from Ca, Sr, and Ba) are components which can be added for various purposes. However, when the amount of the alkaline earth metal components R'O becomes large, the density and the thermal expansion coefficient of a glass increase, and the devitrification resistance deteriorates, and in addition, there is a tendency that the crack generation ratio increases and the ion exchange performance deteriorates. Therefore, the content of the alkaline earth metal components R'O is preferably 0 to 16%, more preferably 0 to 10%, and still more preferably 0 to 6%.

MgO is a component which lowers the high temperature viscosity of a glass to enhance the meltability and the formability, or to enhance the strain point and the Young's modulus. Further, MgO shows, among alkaline earth metal oxides, a relatively high effect of improving the ion exchange performance, therefore, the content thereof can be 0 to 10%. However, when the content of MgO becomes large, there are tendencies that the density, the thermal expansion coefficient and the crack generation ratio of the glass increase, and the glass is easily devitrified. Therefore, it is desirable that the content thereof be 9% or less, 6% or less, or 4% or less.

CaO is a component which lowers the high temperature viscosity of a glass to enhance the meltability and the formability, or to enhance the strain point and the Young's modulus, therefore, the content thereof can be 0 to 10%. However, when the content of CaO becomes large, there are tendencies that the density, the thermal expansion coefficient and the crack generation ratio of the glass increase, and the glass is easily devitrified. Therefore, it is desirable that the content thereof be 8% or less, 5% or less, 3% or less, 1% or less, or 0.8% or less, particularly 0.5% or less, and ideally, it is desirable that CaO be not substantially contained. Here, "CaO be not substantially contained" denotes a case in which the content of CaO in the glass composition is 0.2% or less.

SrO is a component which lowers the high temperature viscosity of a glass to improve the meltability and the formability, or to enhance the strain point and the Young's modulus, therefore, the content thereof can be 0 to 10%. However, when the content of SrO becomes large, there are tendencies that the density, the thermal expansion coefficient, and the crack generation ratio of the glass increase, the glass is easily devitrified, and the ion exchange performance deteriorates. Therefore, it is desirable that the content thereof be 8% or less, 5% or less, 3% or less, 1% or less, or 0.8% or less, particularly 0.5% or less, and ideally, it is desirable that SrO is not substantially contained. Here, "SrO be not substantially contained" denotes a case in which the content of SrO in the glass composition is 0.2% or less.

BaO is a component which lowers the high temperature viscosity of a glass to enhance the meltability and the formability, or to enhance the strain point and the Young's modulus, therefore, the content thereof can be 0 to 3%. However, when the content of BaO becomes large, there are tendencies that the density, the thermal expansion coefficient, and the crack generation ratio of the glass increase, the glass is easily devitrified, and the ion exchange performance deteriorates. Further, because the compound which is the raw material of BaO is an environmental burden material, the use of BaO should be reduced as much as possible from the environmental standpoint. Therefore, it is desirable that the content thereof be 2.5% or less, 2% or less, 1% or less, or 0.8% or less, particularly 0.5% or less, and ideally, it is desirable that BaO be not substantially contained. Here, "BaO be not substantially contained" denotes a case in which the content of BaO in the glass composition is 0.1% or less.

$ZrO_2$ is a component which improves the strain point and Young's modulus of a glass and improves the ion exchange performance, and the content thereof can be 0 to 5%. However, when the content of $ZrO_2$ becomes large, the devitrification resistance of the glass deteriorates. In particular, when formed by an overflow down-draw method, a crystal ascribable to $ZrO_2$ deposits in the interface with a trough-shaped refractory, and the productivity of a glass substrate may lower during operation over a long period of time. The suitable range of $ZrO_2$ is 0 to 5% (desirably 0 to 3%, 0 to 1.5%, 0 to 1%, 0 to 0.8%, or 0 to 0.5%, and particularly 0 to 0.1%).

$P_2O_5$ is a component which enhances the ion exchange performance of a glass, and particularly, shows a high effect of increasing the compression stress depth, therefore, the content thereof can be 0 to 8%. However, then the content of $P_2O_5$ becomes large, the glass shows phase separation and the water resistance thereof deteriorates, therefore, it is preferred that the content thereof be 5% or less, 4% or less, or 3% or less.

When a value obtained by diving the total content of R'O by the total content of $R_2O$ becomes large, the crack generation ratio increases, and simultaneously, there occurs a tendency that the devitrification resistance of the glass deteriorates. Therefore, it is desirable that the value of the mole fraction $R'O/R_2O$ be regulated to 0.5 or less, 0.4 or less, 0.3 or less, 0.2 or less, or 0.1 or less.

Further, other components can be added in a range not significantly deteriorating the property of a glass. For example, one kind or two or more kinds selected from the group consisting of $SO_3$, Cl, $CeO_2$, $Sb_2O_3$, and $SnO_2$ may be contained in an amount of 0 to 3% as a fining agent. $As_2O_3$ and F each also show a fining effect, but they may exert an adverse influence on environments, therefore, it is preferred that the use of $As_2O_3$ and F be reduced as much as possible, and it is more preferred that $As_2O_3$ and F be not substantially contained. $Sb_2O_3$ has toxicity which is lower as compared with $As_2O_3$, however, it is more preferred to limit the use thereof from the environmental standpoint in some cases, and it is preferred that $Sb_2O_3$ be not substantially contained in some cases. When environmental standpoint and fining effect are taken into consideration, it is preferred that $SnO_2$ be contained in an amount of 0.01 to 3% (preferably 0.05 to 1%) as the fining agent. Here, "$As_2O_3$ be not substantially contained" denotes a case in which the content of $As_2O_3$ in the glass composition is 0.1% or less. "F be not substantially contained" denotes a case in which the content of F in the glass composition is 0.05% or less. "$Sb_2O_3$ be not substantially contained" denotes a case in which the content of $SnO_2$ in the glass composition is 0.1% or less. On the other hand, because $Sb_2O_3$ and $SO_3$ show a high effect of suppressing decrease of the transmittance of the glass in the fining agent, it is more preferred that $Sb_2O_3+SO_3$ be contained in an amount of about 0.001 to 5% as the fining agent in applications requiring high transmittance.

Rare earth oxides such as $Nb_2O_5$ and $La_2O_3$ are components which enhance the Young's modulus of a glass. However, the cost of the raw material itself is high, and when contained in a large amount, the devitrification resistance deteriorates. Therefore, it is desirable that the content thereof be limited to 3% or less, 2% or less, or 1% or less, particularly 0.5% or less, and ideally, it is desirable that the rare earth oxides be not substantially contained. Here, "rare earth oxides be not substantially contained" denotes a case in which the content of rare earth oxides in the glass composition is 0.1% or less.

In the present invention, transition metal elements causing intense coloration of a glass such as Co and Ni are not preferred because they decrease the transmittance of a glass substrate. In particular, in the case of using the transition metal elements in a touch panel display application, when the content of a transition metal element is large, the visibility of a touch panel display is deteriorated. Specifically, it is desirable that the use amount of raw materials or cullet be adjusted so that the content is 0.5% or less or 0.1% or less, and particularly 0.05% or less. Because PbO is an environmental burden material, it is more preferred that PbO be not substantially contained. Here, "PbO be not substantially contained" denotes a case in which the content of PbO in the glass composition is 0.1% or less.

The suitable content range of each component can be appropriately selected and used as a preferable glass composition range. Of those, examples of more preferred glass composition ranges include:

(1) a glass composition including, in terms of mol %, 50 to 85% of $SiO_2$, 5 to 12.5% of $Al_2O_3$, 0 to 9% of $Li_2O$, 7 to 20% of $Na_2O$, 0 to 8% of $K_2O$, 0.001 to 8% of $TiO_2$, 0 to 7% of $B_2O_3$, and 20 to 29% of $Li_2O+Na_2O+K_2O+Al_2O_3$, having a $(Li_2O+Na_2O+K_2O)/Al_2O_3$ value of 1.5 to 2.5 and a $(MgO+CaO)/Al_2O_3$ value of 0 to 0.5 in terms of mole fraction, and being substantially free of $As_2O_3$, F, PbO, and BaO;

(2) a glass composition including, in terms of mol %, 55 to 75% of $SiO_2$, 6 to 11% of $Al_2O_3$, 0 to 8% of $Li_2O$, 7 to 20% of $Na_2O$, 0 to 8% of $K_2O$, 0.01 to 5% of $TiO_2$, 0 to 3% of $B_2O_3$, 0 to 10% of ZnO, 0 to 5% of $ZrO_2$, 0 to 5.5% of MgO, 0 to 5.5% of CaO, 0 to 5% of SrO, 0 to 3% of $P_2O_5$, and 22 to 28.5% of $Li_2O+Na_2O+K_2O+Al_2O_3$, having a $(Li_2O+Na_2O+K_2O)/Al_2O_3$ value of 1.8 to 2.4 and a $(MgO+CaO)/Al_2O_3$ value of 0 to 0.5 in terms of mole fraction, and being substantially free of $As_2O_3$, F, PbO, and BaO;

(3) a glass composition including, in terms of mol %, 55 to 75% of $SiO_2$, 7 to 9% of $Al_2O_3$, 0 to 8% of $Li_2O$, 7 to 18% of $Na_2O$, 0 to 7% of $K_2O$, 0.01 to 5% of $TiO_2$, 0 to 1% of $B_2O_3$, 0 to 6% of ZnO, 0 to 5% of $ZrO_2$, 0 to 4.5% of MgO, 0 to 4.5% of CaO, 0 to 5% of SrO, 0 to 0.5% of $P_2O_5$, and 22 to 28.5% of $Li_2O+Na_2O+K_2O+Al_2O_3$, having a $(Li_2O+Na_2O+K_2O)/Al_2O_3$ value of 1.9 to 2.4 and a $(MgO+CaO)/Al_2O_3$ value of 0 to 0.5 in terms of mole fraction and being substantially free of $As_2O_3$, F, PbO, and BaO;

(4) a glass composition including, in terms of mol %, 50 to 85% of $SiO_2$, 5 to 12.5% of $Al_2O_3$, 0 to 7% of $B_2O_3$, 0.5 to 10% $Li_2O$, 0 to 15% of $Na_2O$, 0 to 10% of $K_2O$, 0.1 to 10% of $TiO_2$, 0 to 10% of ZnO, 0 to 5% of $ZrO_2$, 0 to 10% of MgO, 0 to 5% of CaO, 0 to 5% of SrO, 0 to 1% of BaO, 0 to 5% of $P_2O_5$, and 20 to 28.5% of $Li_2O+Na_2O+K_2O+Al_2O_3$, having a $(Li_2O+Na_2O+K_2O)/Al_2O_3$ value of 1.5 to 2.5 in terms of mole fraction and being substantially free of F; and (5) a glass composition including, in terms of mol %, 58 to 70% of $SiO_2$, 6 to 11% of $Al_2O_3$, 0 to 3% of $B_2O_3$, 3 to 10% $Li_2O$, 6 to 11% of $Na_2O$, 0 to 4% of $K_2O$, 0.1 to 4% of $TiO_2$, 0 to 10% of ZnO, 0 to 1% of $ZrO_2$, 0 to 9% of MgO, 0 to 3% of CaO, 0 to 3% of SrO, 0 to 1% of BaO, 0 to 3% of $P_2O_5$, and 22 to 28.5% of $Li_2O+Na_2O+K_2O+Al_2O_3$, having a $(Li_2O+Na_2O+K_2O)/Al_2O_3$ value of 1.8 to 2.3 in terms of mole fraction, and being substantially free of F.

When the glass composition is regulated in the above-mentioned range, the devitrification resistance of a glass can be improved significantly, and in addition, a viscosity property necessary for formation by an overflow down-draw method can be surely obtained, and the ion exchange performance can be improved remarkably.

The tempered glass substrate of the present invention has the above-mentioned glass composition, and simultaneously, has a compression stress layer on the glass surface. The compression stress of the compression stress layer is preferably 100 MPa or more, more preferably 300 MPa or more, still more preferably 400 MPa or more, still more preferably 500 MPa or more, particularly preferably 600 MPa or more, and most preferably 700 MPa or more. The larger the compression stress is, the greater the mechanical strength of a glass substrate is. On the other hand, when extremely large compression stress is formed on the surface of the glass substrate, there is a possibility that micro cracks are generated on the substrate surface, which may lead to a decrease in the strength of the glass, therefore, it is more preferred that the compression stress of the compression stress layer be 2000 MPa or less.

The depth of the compression stress layer is preferably 1 μm or more, more preferably 3 μm or more, still more preferably 5 μm or more, particularly preferably 10 μm or more, and most preferably 15 μm or more. The large the depth of the compression stress layer is, the more difficult it is that the glass substrate is cracked even if a deep flaw is formed in the glass substrate. On the other hand, if an extremely big compression stress layer is formed on the surface of the glass substrate, it becomes difficult to cut the glass substrate, therefore, the depth of the compression stress layer is preferably 500 μm or less.

It is preferred that the tempered glass substrate of the present invention have a plate thickness of 2.0 mm or less, 1.5 mm or less, 0.7 mm or less, or 0.5 mm or less, and particularly 0.3 mm or less. When the plate thickness of the glass substrate is smaller, the weight of the glass substrate can be further reduced. The tempered glass substrate of the present invention has a merit that even if the plate thickness is decreased, the glass substrate is not broken easily.

It is more preferred that the tempered glass substrate of the present invention have an unpolished surface. The theoretical strength of a glass is essentially very high, but breakage often occurs even with a stress which is by far lower than the theoretical strength. This phenomenon occurs because a small defect called Griffith flaw is generated on the surface of the glass substrate after forming of the glass, for example, in a polishing process. Therefore, when the surface of the tempered glass substrate is not polished, the original mechanical strength of the glass substrate is not lowered easily, and the glass substrate is not broken easily. Further, when the surface of the glass substrate is not polished, a polishing process can be omitted in the glass substrate production process, thus, the production cost of the glass substrate can be decreased. In the tempered glass substrate of the present invention, if the both surfaces of a glass substrate are not polished, the glass substrate becomes more difficult to break. In the tempered glass substrate of the present invention, a chamfering process and the like may be performed on the cut surface of the glass substrate to prevent breakage occurring from the cut surface of the glass substrate.

The glass substrate according to the present invention can be produced by placing a glass raw material which is prepared to have a desired glass composition in a continuous melting furnace, melting the glass raw material by heating at 1500 to 1600° C., fining the resultant, feeding the resultant to a forming apparatus, forming the molten glass into a plate shape, and gradually cooling the resultant.

It is preferred that the glass substrate of the present invention is obtained by being formed by an overflow down-draw method. When a glass substrate is formed by the overflow down-draw method, a glass substrate which is not polished and has an excellent surface quality can be produced. The reason for this is as follows: in the case of adopting the overflow down-draw method, the surface to be the surface of the glass substrate does not come in direct contact with a trough-shaped refractory, and is formed in the form of free surface, and hence, a glass substrate which is not polished and has excellent surface quality can be formed. Here, the overflow down-draw method is a method in which a glass in molten condition is allowed to overflow from both sides of a heat-resistant trough-shaped structure, and the overflown molten glasses are draw-formed downwardly while combining them at the lower end of the trough-shaped structure, to thereby produce a glass substrate. The structure and material of the trough-shaped structure are not particularly limited as long as they provide desired size and surface precision of the glass substrate and can realize quality usable in the glass substrate. Further, any method may be used to apply force to the glass substrate to perform downward draw forming. For example, there may be adopted a method involving rotating a heat resistant roll having sufficiently large width in the state of being in contact with a glass substrate, to thereby draw the glass substrate, and a method involving allowing several pairs of heat resistant rolls to come into contact with only end surfaces of the glass substrate to thereby draw the glass substrate. The glass of the present invention is excellent in devitrification resistance and has a viscosity property suitable for forming, thus, forming by the overflow down-draw method can be carried out with good precision by using the glass of the present invention. When the liquidus temperature is 1300° C. or lower and the liquidus viscosity is $10^{4.0}$ dPa·s or more, the glass substrate can be produced by the overflow down-draw method.

As the method of forming the tempered glass substrate of the present invention, various methods can be adopted in addition to the overflow down-draw method. For example, various forming methods can be adopted such as a float method, a slot down method, a re-draw method, a roll out method, and a press method. In particular, if a glass is formed by the press method, a small-sized glass substrate can be produced with good efficiency.

As the method of producing the tempered glass substrate of the present invention, it is preferred that a tempering treatment be performed, and then a glass substrate is cut into desired substrate size. By doing so, a tempered glass substrate can be obtained at low cost.

The tempered glass substrate of the present invention preferably satisfies the following properties.

In the tempered glass substrate of the present invention, it is preferred that the liquidus temperature of the glass be 1,200° C. or lower, 1100° C. or lower, 1050° C. or lower, 1000° C. or lower, or 450° C. or lower, and particularly 930° C. or lower. When the liquidus temperature of the tempered glass substrate is lower, the glass is not devitrified easily during forming by the overflow down-draw method and the like.

In the tempered glass substrate of the present invention, the liquidus viscosity of the glass is preferably $10^{4.0}$ dPa·s or more, $10^{4.3}$ dPa·s or more, $10^{4.5}$ dPa·s or more, $10^{5.0}$ dPa·s or more, $10^{5.3}$ dPa·s or more, or $10^{5.5}$ dPa·s or more, and particularly preferably $10^{5.7}$ dPa·s or more. When the liquidus viscosity of the glass is larger, the glass is not devitrified easily during forming by the overflow down-draw method and the like.

In the tempered glass substrate of the present invention, the glass density is preferably 2.8 g/cm$^3$ or less, 2.7 g/cm$^3$ or less, 2.6 g/cm$^3$ or less, 2.55 g/cm$^3$ or less, 2.5 g/cm$^3$ or less, or 2.45 g/cm$^3$ or less, and particularly preferably 2.4 g/cm$^3$ or less. When the glass density is smaller, the weight of the glass substrate can be reduced more.

In the tempered glass substrate of the present invention, the glass thermal expansion coefficient in the temperature range of 30 to 380° C. is preferably 40 to $95 \times 10^{-7}$/° C., more preferably 70 to $95 \times 10^{-7}$/° C., still more preferably 75 to $95 \times 10^{-7}$/° C., particularly preferably 77 to $90 \times 10^{-7}$/° C., and most preferably 80 to $90 \times 10^{-7}$/° C. When the thermal expansion coefficient of the glass is set within the above-mentioned range, the thermal expansion coefficient thereof tends to match those of members such as metals and organic adhesives, and peeling of members such as metals and organic adhesives can be prevented.

In the tempered glass substrate of the present invention, the temperature at a glass high temperature viscosity of $10^{2.5}$ dPa·s is preferably 1700° C. or lower, more preferably 1600° C. or lower, still more preferably 1550° C. or lower, and particularly preferably 1500° C. or lower. When the temperature at a glass high temperature viscosity of $10^{2.5}$ dPa·s is lower, burden on a glass production facility such as a melting kiln is smaller, and the bubble quality of the glass substrate can be further improved. Therefore, when the temperature at the glass high temperature viscosity of $10^{2.5}$ dPa·s is lower, the glass substrate can be produced at lower cost. The temperature at the glass high temperature viscosity of $10^{2.5}$ dPa·s corresponds to the glass melting temperature, and when the temperature at the glass high temperature viscosity of $10^{2.5}$ dPa·s is lower, the glass can be melted at lower temperature.

In the tempered glass substrate of the present invention, the glass Young's modulus is preferably 70 GPa or more, more preferably 71 GPa or more, and still more preferably 73 GPa or more. When the glass Young's modulus is higher, the glass substrate does not bend easily. As a result, when a display is pushed by a pen or the like in devices such as a touch panel display and the like, a liquid crystal device or the like in the device is not pressed easily, therefore, poor display scarcely occurs on the display.

In the tempered glass substrate of the present invention, the glass specific Young's modulus is preferably 27 GPa/(g/cm$^3$) or more, more preferably 28 GPa/(g/cm$^3$) or more, still more preferably 29 GPa/(g/cm$^3$) or more, and particularly preferably 30 GPa/(g/cm$^3$) or more. When the glass specific Young's modulus is higher, bending of the glass substrate due to its own weight is decreased. As a result, when glass substrates are accommodated in a cassette and the like in the production process, the clearance between the glass substrates can be decreased, leading to improvement in productivity.

In the tempered glass substrate of the present invention, the glass crack generation ratio is preferably 60% or less, more preferably 50% or less, still more preferably 40% or less, particularly preferably 30% or less, and most preferably 20% or less. When the glass crack generation ratio is smaller, cracks are not generated easily on the glass substrate.

The glass of the present invention is characterized by including, as a glass component, in terms of mol %, 50 to 85% of $SiO_2$, 5 to 30% of $Al_2O_3$, 0 to 20% $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, having a ($Li_2O+Na_2O+K_2O$)/$Al_2O_3$ value of 0.7 to 3 in terms of mole fraction, and being substantially free of $As_2O_3$ and F. In addition, the glass of the present invention is characterized by including, as a glass component, in terms of mol %, 50 to 85% of $SiO_2$, 5 to 30% of $Al_2O_3$, 0 to 7% of $B_2O_3$, 0.5 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, and having a ($Li_2O+Na_2O+K_2O$)/$Al_2O_3$ value of 0.7 to 3 in terms of mole fraction. In the glass of the present invention, the reason for limiting the glass composition in the above-mentioned range and preferable ranges thereof are the same as those for the above-mentioned tempered glass substrate, therefore, descriptions thereof are omitted here. Further, the glass of the present invention is capable of, naturally, having simultaneously the properties and effects of the tempered glass substrate described above.

When the glass of the present invention is ion-exchanged in a $KNO_3$ molten salt of 430° C. for 4 hours, it is more preferred that the surface compression stress be 200 MPa or more and the depth of the compression stress layer be 3 μm or more. Because the glass composition is regulated in the above-mentioned range, the glass of the present invention has an excellent ion exchange performance, and the surface compression stress can be easily set to 200 MPa or more and the depth of the compression stress layer can be easily set to 3 μm or more.

The glass of the present invention is characterized by including, as a glass component, in terms of mol %, 50 to 85% of $SiO_2$, 5 to 30% of $Al_2O_3$, 0 to 20% $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, having a ($Li_2O+Na_2O+K_2O$)/$Al_2O_3$ value of 0.7 to 3 in terms of mole fraction, being substantially free of $As_2O_3$ and F, and having a compression stress layer formed on the surface thereof. In addition, the glass of the present invention is characterized by including, as a glass component, in terms of mol %, 50 to 85% of $SiO_2$, 5 to 30% of $Al_2O_3$, 0 to 7% of $B_2O_3$, 0.5 to 20% of $Li_2O$, 0 to 20% of $Na_2O$, 0 to 20% of $K_2O$, 0.001 to 10% of $TiO_2$, and 15 to 35% of $Li_2O+Na_2O+K_2O+Al_2O_3$, having a ($Li_2O+Na_2O+K_2O$)/$Al_2O_3$ value of 0.7 to 3 in terms of mole fraction, and having a compression stress layer formed on the surface thereof. The reason for limiting the glass composition to the above-mentioned range and the reason for forming the compression stress layer are the same as those for the tempered glass substrate described above, therefore, descriptions thereof are omitted here. Further, the tempered glass of the present invention is capable of, naturally, having simultaneously the properties and effects of the tempered glass substrate described above.

A touch panel display is mounted on cellular phones, digital cameras, PDA, and the like. A touch panel display for mobile application is eagerly required to attain weight reduction, thickness reduction, and tempering, and a glass substrate having small thickness and having high mechanical strength is required. In those points, the tempered glass substrate of the present invention can be used in those applications suitably, because practically sufficient mechanical strength is obtained even when the thickness thereof is reduced. Further, the tempered glass substrate can be also used as a cover glass for protecting LCD and the like mounted on cellular phones, digital cameras and the like.

EXAMPLE 1

The present invention is described based on examples below.

Tables 1 to 7 show examples of the present invention (sample Nos. 1 to 46) and Comparative examples of the present invention (sample Nos. 47 and 48).

TABLE 1

|  |  | Examples | | | | | | |
|---|---|---|---|---|---|---|---|---|
|  |  | No. 1 | No. 2 | No. 3 | No. 4 | No. 5 | No. 6 | No. 7 |
| Glass composition (mole %) | $SiO_2$ | 73.58 | 72.04 | 72.19 | 73.85 | 73.18 | 72.56 | 70.93 |
|  | $Al_2O_3$ | 8.42 | 8.24 | 7.90 | 7.86 | 7.86 | 7.86 | 7.86 |
|  | $B_2O_3$ | — | 1.39 | — | — | — | — | — |
|  | ZnO | 1.65 | 1.59 | 1.52 | — | — | — | — |
|  | $Li_2O$ | 4.07 | 3.89 | 8.30 | 8.25 | 8.26 | 8.25 | 8.25 |
|  | $Na_2O$ | 8.48 | 8.34 | 8.00 | 7.96 | 7.96 | 7.95 | 7.96 |
|  | $K_2O$ | 3.67 | 3.57 | 1.97 | 1.96 | 1.96 | 1.96 | 1.96 |
|  | BaO | — | — | — | — | — | 0.64 | 0.64 |
|  | $Sb_2O_3$ | 0.11 | 0.11 | 0.11 | 0.11 | 0.10 | 0.10 | 0.10 |
|  | $ZrO_2$ | — | 0.79 | — | — | — | — | — |
|  | $TiO_2$ | 0.02 | 0.04 | 0.01 | 0.01 | 0.03 | 0.03 | 1.65 |
|  | $P_2O_5$ | — | — | — | — | 0.65 | 0.65 | 0.65 |
| $R_2O + Al_2O_3$ |  | 24.6 | 24.0 | 26.2 | 26.0 | 26.0 | 26.0 | 26.0 |
| $R_2O/Al_2O_3$ |  | 1.93 | 1.92 | 2.31 | 2.31 | 2.31 | 2.31 | 2.31 |
| Density (g/cm$^3$) |  | 2.43 | 2.46 | 2.43 | 2.39 | 2.39 | 2.44 | 2.42 |
| Strain point Ps (° C.) |  | 468 | 482 | 443 | 445 | 454 | 461 | 451 |
| Annealing point Ta (° C.) |  | 515 | 528 | 486 | 488 | 497 | 502 | 493 |

TABLE 1-continued

|  | Examples | | | | | | |
| --- | --- | --- | --- | --- | --- | --- | --- |
|  | No. 1 | No. 2 | No. 3 | No. 4 | No. 5 | No. 6 | No. 7 |
| Softening point Ts (° C.) | 756 | 757 | 699 | 704 | 733 | 717 | 722 |
| $10^4$ dPa · s (° C.) | 1190 | 1179 | 1092 | 1106 | 1126 | 1111 | 1101 |
| $10^3$ dPa · s (° C.) | 1429 | 1410 | 1313 | 1334 | 1355 | 1337 | 1315 |
| $10^{2.5}$ dPa · s (° C.) | 1593 | 1564 | 1458 | 1489 | 1510 | 1490 | 1465 |
| Thermal expansion coefficient α ($\times 10^{-7}$/° C.) | 85 | 83 | 86 | 85 | 85 | 85 | 85 |
| Liquidus temperature (° C.) | 895 | 870 | 870 | 870 | 885 | 900 | 880 |
| Liquidus viscosity (dPa · s) | 6.0 | 6.2 | 5.6 | 5.7 | 5.7 | 5.5 | 5.7 |
| Young's modulus (GPa) | 73 | 75 | 76 | 75 | Not melted | Not melted | Not melted |
| Specific modulus (GPa/(g/cm³)) | 30 | 31 | 31 | 32 | Not measured | Not measured | Not measured |
| Crack generation ratio (%) | 5 | 30 | 0 | 0 | Not measured | Not measured | Not measured |
| Compression stress (MPa) | 520 | 640 | 530 | 430 | 540 | 490 | 610 |
| Depth of stress layer (μm) | 32 | 24 | 18 | 21 | 22 | 20 | 16 |

TABLE 2

|  |  | Examples | | | | | | |
| --- | --- | --- | --- | --- | --- | --- | --- | --- |
|  |  | No. 8 | No. 9 | No. 10 | No. 11 | No. 12 | No. 13 | No. 14 |
| Glass composition (mole %) | $SiO_2$ | 69.77 | 71.51 | 78.94 | 77.94 | 71.57 | 74.84 | 69.86 |
|  | $Al_2O_3$ | 7.86 | 7.86 | 7.86 | 7.86 | 14.24 | 12.49 | 14.99 |
|  | $Li_2O$ | 8.24 | 8.25 | 8.25 | 9.25 | 9.24 | 8.33 | 9.99 |
|  | $Na_2O$ | 7.96 | 7.96 | 0.53 | 0.53 | 0.53 | 4.16 | 5.00 |
|  | $K_2O$ | 1.96 | 0.21 | 0.21 | 0.21 | 0.21 | — | — |
|  | BaO | 0.64 | 0.64 | 0.64 | 0.64 | 0.64 | — | — |
|  | $Sb_2O_3$ | 0.10 | 0.10 | 0.10 | 0.10 | 0.10 | 0.10 | 0.10 |
|  | $ZrO_2$ | 1.17 | 1.17 | 1.17 | 1.17 | 1.17 | — | — |
|  | $TiO_2$ | 1.65 | 1.65 | 1.65 | 1.65 | 1.65 | 0.08 | 0.06 |
|  | $P_2O_5$ | 0.65 | 0.65 | 0.65 | 0.65 | 0.65 | — | — |
| $R_2O + Al_2O_3$ |  | 26.0 | 24.3 | 16.9 | 17.9 | 24.2 | 25.0 | 30.0 |
| $R_2O/Al_2O_3$ |  | 2.31 | 2.09 | 1.14 | 1.27 | 0.70 | 1.00 | 1.00 |
| Density (g/cm³) |  | 2.48 | 2.47 | 2.35 | 2.37 | 2.42 | 2.34 | 2.39 |
| Strain point Ps (° C.) |  | 477 | 495 | 631 | 606 | 669 | 663 | 646 |
| Annealing point Ta (° C.) |  | 518 | 537 | 689 | 659 | 726 | 724 | 702 |
| Softening point Ts (° C.) |  | 731 | 758 | Not measured | Not measured | Not measured | 1006 | 961 |
| $10^4$ dPa · s (° C.) |  | 1105 | 1140 | 1416 | 1368 | 1348 | 1414 | 1339 |
| $10^3$ dPa · s (° C.) |  | 1316 | 1355 | 1644 | 1595 | 1533 | 1619 | 1539 |
| $10^{2.5}$ dPa · s (° C.) |  | 1454 | 1498 | Not measured | 1700 | 1647 | 1700 | 1665 |
| Thermal expansion coefficient α ($\times 10^{-7}$/° C.) |  | 84 | 76 | 43 | 46 | 44 | 58 | 66 |
| Liquidus temperature (° C.) |  | 875 | <900 | Not measured | Not measured | Not measured | 1285 | 1280 |
| Liquidus viscosity (dPa · s) |  | 5.8 | >5.8 | Not measured | Not measured | Not measured | 4.8 | 4.4 |
| Young's modulus (GPa) |  | Not measured | Not measured | Not measured | Not measured | Not measured | Not measured | Not measured |
| Specific modulus (GPa/(g/cm³)) |  | Not measured | Not measured | Not measured | Not measured | Not measured | Not measured | Not measured |
| Crack generation ratio (%) |  | Not measured | Not measured | Not measured | Not measured | Not measured | 25 | 0 |
| Compression stress (MPa) |  | 700 | 770 | 820 | 900 | Not measured | 870 | 530 |
| Depth of stress layer (μm) |  | 15 | 10 | 12 | 9 | Not measured | 24 | 15 |

TABLE 3

| | | Examples | | | | | | |
|---|---|---|---|---|---|---|---|---|
| | | No. 15 | No. 16 | No. 17 | No. 18 | No. 19 | No. 20 | No. 21 |
| Glass composition (mole %) | $SiO_2$ | 64.86 | 69.90 | 64.89 | 73.57 | 71.75 | 70.29 | 70.78 |
| | $Al_2O_3$ | 17.49 | 12.50 | 12.50 | 8.42 | 8.47 | 8.49 | 8.55 |
| | $B_2O_3$ | — | — | — | — | — | 1.39 | — |
| | ZnO | — | — | — | — | 1.66 | 1.67 | 1.68 |
| | $Li_2O$ | 11.66 | 11.66 | 15.00 | 4.07 | 4.10 | 4.11 | 4.14 |
| | $Na_2O$ | 5.83 | 5.83 | 7.50 | 8.48 | 8.53 | 8.54 | 8.61 |
| | $K_2O$ | 0.00 | 0.00 | 0.00 | 3.67 | 3.69 | 3.70 | 3.73 |
| | $Sb_2O_3$ | 0.10 | 0.10 | 0.10 | 0.11 | 0.11 | 0.11 | 0.11 |
| | $TiO_2$ | 0.06 | 0.01 | 0.01 | 1.68 | 1.69 | 1.70 | 1.71 |
| | $P_2O_5$ | — | — | — | — | — | — | 0.69 |
| $R_2O + Al_2O_3$ | | 35.0 | 30.0 | 35.0 | 24.6 | 24.8 | 24.8 | 25.0 |
| $R_2O/Al_2O_3$ | | 1.00 | 1.40 | 1.80 | 1.93 | 1.93 | 1.93 | 1.93 |
| Density (g/cm³) | | 2.41 | 2.40 | 2.43 | 2.42 | 2.46 | 2.46 | 2.45 |
| Strain point Ps (° C.) | | Not measured | 502 | 460 | 478 | 481 | 479 | 492 |
| Annealing point Ta (° C.) | | Not measured | 547 | 499 | 523 | 526 | 521 | 538 |
| Softening point Ts (° C.) | | Not measured | Not measured | Not measured | 749 | 751 | 730 | 780 |
| $10^4$ dPa·s (° C.) | | 1268 | 1197 | 1046 | 1181 | 1169 | 1140 | 1176 |
| $10^3$ dPa·s (° C.) | | 1451 | 1429 | 1251 | 1427 | 1403 | 1374 | 1406 |
| $10^{2.5}$ dPa·s (° C.) | | 1570 | 1581 | 1383 | 1583 | 1557 | 1528 | 1557 |
| Thermal expansion coefficient α ($\times 10^{-7}$/° C.) | | 73 | 73 | 87 | 84 | 86 | 85 | 86 |
| Liquidus temperature (° C.) | | 1270 | 1185 | 1040 | 915 | 910 | 895 | 915 |
| Liquidus viscosity (dPa·s) | | Not measured | 4.1 | 4.1 | 5.8 | 5.8 | 5.7 | 5.9 |
| Young's modulus (GPa) | | Not measured | Not measured | Not measured | Not measured | 75 | 76 | 74 |
| Specific modulus (GPa/(g/cm³)) | | Not measured | Not measured | Not measured | Not measured | 31 | 31 | 30 |
| Crack generation ratio (%) | | 0 | 0 | 0 | 35 | 5 | 10 | 5 |
| Compression stress (MPa) | | 600 | 200 | Not measured | 530 | 650 | 680 | 640 |
| Depth of stress layer (μm) | | 14 | 9 | Not measured | 31 | 25 | 23 | 32 |

TABLE 4

| | | Examples | | | | | | |
|---|---|---|---|---|---|---|---|---|
| | | No. 22 | No. 23 | No. 24 | No. 25 | No. 26 | No. 27 | No. 28 |
| Glass composition (mole %) | $SiO_2$ | 79.90 | 79.89 | 78.38 | 78.39 | 76.84 | 76.89 | 73.84 |
| | $Al_2O_3$ | 5.71 | 5.00 | 6.14 | 5.37 | 6.57 | 5.75 | 5.71 |
| | ZnO | — | — | — | — | — | — | 5.99 |
| | $Li_2O$ | 3.57 | 3.75 | 3.84 | 4.03 | 4.10 | 4.31 | 3.57 |
| | $Na_2O$ | 7.14 | 7.50 | 7.68 | 8.06 | 8.21 | 8.62 | 7.14 |
| | $K_2O$ | 3.57 | 3.75 | 3.84 | 4.03 | 4.10 | 4.31 | 3.57 |
| | $Sb_2O_3$ | 0.10 | 0.10 | 0.10 | 0.10 | 0.10 | 0.10 | 0.10 |
| | $TiO_2$ | 0.01 | 0.01 | 0.02 | 0.02 | 0.08 | 0.02 | 0.08 |
| $R_2O + Al_2O_3$ | | 20.0 | 20.0 | 21.5 | 21.5 | 23.0 | 23.0 | 20.0 |
| $R_2O/Al_2O_3$ | | 2.50 | 3.00 | 2.50 | 3.00 | 2.50 | 3.00 | 2.50 |
| Density (g/cm³) | | 2.37 | 2.37 | 2.38 | 2.38 | 2.39 | 2.39 | 2.50 |
| Strain point Ps (° C.) | | 457 | 447 | 452 | 441 | 448 | 437 | 474 |
| Annealing point Ta (° C.) | | 506 | 494 | 500 | 487 | 494 | 482 | 522 |
| Softening point Ts (° C.) | | 754 | 733 | 739 | 718 | 725 | 704 | 759 |
| $10^4$ dPa·s (° C.) | | 1198 | 1165 | 1179 | 1141 | 1156 | 1114 | 1171 |
| $10^3$ dPa·s (° C.) | | 1448 | 1406 | 1425 | 1378 | 1397 | 1348 | 1394 |
| $10^{2.5}$ dPa·s (° C.) | | 1614 | 1566 | 1587 | 1536 | 1555 | 1501 | 1545 |
| Thermal expansion coefficient α ($\times 10^{-7}$/° C.) | | 76 | 79 | 80 | 84 | 84 | 88 | 81 |
| Liquidus temperature (° C.) | | <800 | <800 | 805 | <800 | 835 | 815 | <800 |
| Liquidus viscosity (dPa·s) | | >7.0 | >6.8 | >6.8 | >6.6 | 6.3 | 6.2 | >7.0 |
| Young's modulus (GPa) | | 71 | 71 | 72 | 71 | 72 | 71 | 74 |
| Specific modulus (GPa/(g/cm³)) | | 30 | 30 | 30 | 30 | 30 | 30 | 29 |
| Crack generation ratio (%) | | 5 | 5 | 0 | 0 | 0 | 0 | 10 |
| Compression stress (MPa) | | 340 | 320 | 350 | 310 | 380 | 320 | 620 |
| Depth of stress layer (μm) | | 31 | 36 | 36 | 36 | 34 | 36 | 21 |

TABLE 5

| | | Examples | | | | | | |
|---|---|---|---|---|---|---|---|---|
| | | No. 29 | No. 30 | No. 31 | No. 32 | No. 33 | No. 34 | No. 35 |
| Glass composition (mole %) | $SiO_2$ | 73.87 | 73.87 | 73.85 | 73.85 | 73.86 | 73.85 | 70.42 |
| | $Al_2O_3$ | 5.71 | 5.71 | 5.71 | 5.71 | 5.71 | 5.71 | 8.47 |
| | $B_2O_3$ | — | 6.00 | — | 3.00 | 3.00 | 2.00 | — |
| | ZnO | — | — | 3.00 | 3.00 | — | 2.00 | 3.00 |
| | $Li_2O$ | 3.57 | 3.57 | 3.57 | 3.57 | 3.57 | 3.57 | 4.10 |
| | $Na_2O$ | 7.14 | 7.14 | 7.14 | 7.14 | 7.14 | 7.14 | 8.52 |
| | $K_2O$ | 3.57 | 3.57 | 3.57 | 3.57 | 3.57 | 3.57 | 3.69 |
| | MgO | 6.00 | — | 3.00 | — | 3.00 | 2.00 | — |
| | $Sb_2O_3$ | 0.10 | 0.10 | 0.10 | 0.10 | 0.10 | 0.10 | 0.11 |
| | $TiO_2$ | 0.04 | 0.04 | 0.06 | 0.06 | 0.05 | 0.06 | 1.69 |
| $R_2O + Al_2O_3$ | | 20.0 | 20.0 | 20.0 | 20.0 | 20.0 | 20.0 | 24.8 |
| $R_2O/Al_2O_3$ | | 2.50 | 2.50 | 2.50 | 2.50 | 2.50 | 2.50 | 1.93 |
| Density (g/cm³) | | 2.40 | 2.40 | 2.45 | 2.45 | 2.40 | 2.43 | 2.48 |
| Strain point Ps (° C.) | | 478 | 480 | 474 | 473 | 474 | 473 | 483 |
| Annealing point Ta (° C.) | | 526 | 520 | 522 | 516 | 516 | 517 | 527 |
| Softening point Ts (° C.) | | 771 | 714 | 764 | 727 | 729 | 737 | 749 |
| $10^4$ dPa·s (° C.) | | 1195 | 1126 | 1181 | 1132 | 1141 | 1154 | 1156 |
| $10^3$ dPa·s (° C.) | | 1417 | 1369 | 1403 | 1365 | 1374 | 1386 | 1385 |
| $10^{2.5}$ dPa·s (° C.) | | 1559 | 1537 | 1549 | 1521 | 1530 | 1538 | 1534 |
| Thermal expansion coefficient α ($\times 10^{-7}$/° C.) | | 80 | 72 | 81 | 76 | 77 | 78 | 86 |
| Liquidus temperature (° C.) | | <800 | <800 | <800 | <800 | <800 | <800 | 895 |
| Liquidus viscosity (dPa·s) | | >7.2 | >6.4 | >7.1 | >6.6 | >6.7 | >6.8 | 5.9 |
| Young's modulus (GPa) | | 74 | 77 | 74 | 75 | 75 | 75 | 75 |
| Specific modulus (GPa/(g/cm³)) | | 31 | 32 | 30 | 31 | 31 | 31 | 30 |
| Crack generation ratio (%) | | 15 | 10 | 5 | 5 | 20 | 10 | 0 |
| Compression stress (MPa) | | 570 | 530 | 590 | 570 | 560 | 570 | 730 |
| Depth of stress layer (μm) | | 21 | 16 | 21 | 18 | 18 | 19 | 21 |

TABLE 6

| | | Examples | | | | | | |
|---|---|---|---|---|---|---|---|---|
| | | No. 36 | No. 37 | No. 38 | No. 39 | No. 40 | No. 41 | No. 42 |
| Glass composition (mole %) | $SiO_2$ | 68.96 | 69.47 | 67.41 | 65.96 | 66.47 | 71.76 | 71.76 |
| | $Al_2O_3$ | 8.49 | 8.55 | 8.47 | 8.49 | 8.55 | 7.13 | 8.47 |
| | $B_2O_3$ | 1.39 | — | — | 1.39 | — | — | — |
| | ZnO | 3.00 | 3.00 | 6.00 | 6.00 | 6.00 | 3.00 | 3.00 |
| | $Li_2O$ | 4.11 | 4.14 | 4.10 | 4.11 | 4.14 | 4.10 | 2.76 |
| | $Na_2O$ | 8.54 | 8.60 | 8.53 | 8.54 | 8.60 | 8.52 | 8.52 |
| | $K_2O$ | 3.70 | 3.73 | 3.69 | 3.70 | 3.73 | 3.69 | 3.69 |
| | $Sb_2O_3$ | 0.11 | 0.11 | 0.11 | 0.11 | 0.11 | 0.11 | 0.11 |
| | $TiO_2$ | 1.70 | 1.71 | 1.69 | 1.70 | 1.71 | 1.69 | 1.69 |
| | $P_2O_5$ | — | 0.69 | — | — | — | — | — |
| $R_2O + Al_2O_3$ | | 24.8 | 25.0 | 24.8 | 24.8 | 25.0 | 23.4 | 23.4 |
| $R_2O/Al_2O_3$ | | 1.93 | 1.93 | 1.93 | 1.93 | 1.93 | 2.29 | 1.77 |
| Density (g/cm³) | | 2.49 | 2.48 | 2.55 | 2.55 | 2.54 | 2.48 | 2.47 |
| Strain point Ps (° C.) | | 478 | 489 | 488 | 479 | 489 | 471 | 504 |
| Annealing point Ta (° C.) | | 520 | 533 | 531 | 520 | 531 | 515 | 550 |
| Softening point Ts (° C.) | | 730 | 762 | 744 | 723 | 747 | 732 | 785 |
| $10^4$ dPa·s (° C.) | | 1127 | 1164 | 1129 | 1100 | 1126 | 1131 | 1213 |
| $10^3$ dPa·s (° C.) | | 1354 | 1390 | 1340 | 1312 | 1334 | 1356 | 1448 |
| $10^{2.5}$ dPa·s (° C.) | | 1501 | 1535 | 1476 | 1446 | 1467 | 1500 | 1606 |
| Thermal expansion coefficient α ($\times 10^{-7}$/° C.) | | 86 | Not measured | 88 | 87 | 89 | 87 | 83 |
| Liquidus temperature (° C.) | | 880 | 910 | 975 | 875 | 905 | 860 | 905 |
| Liquidus viscosity (dPa·s) | | 5.8 | 5.8 | 5.0 | 5.7 | 5.7 | 6.0 | 6.2 |
| Young's modulus (GPa) | | 76 | 75 | 76 | 76 | 76 | 75 | 74 |
| Specific modulus (GPa/(g/cm³)) | | 30 | 30 | 30 | 30 | 30 | 30 | 30 |
| Crack generation ratio (%) | | 0 | 0 | 10 | 10 | 5 | 0 | 0 |
| Compression stress (MPa) | | 750 | 720 | 870 | 870 | 840 | 640 | 720 |
| Depth of stress layer (μm) | | 17 | 24 | 17 | 16 | 19 | 20 | 24 |

TABLE 7

|  |  | Examples | | | | Comparative Examples | |
|---|---|---|---|---|---|---|---|
|  |  | No. 43 | No. 44 | No. 45 | No. 46 | No. 47 | No. 48 |
| Glass composition (mole %) | $SiO_2$ | 67.41 | 67.41 | 67.41 | 60.38 | 72.17 | 74.84 |
|  | $Al_2O_3$ | 8.47 | 8.47 | 8.47 | 8.51 | 14.20 | 3.85 |
|  | $B_2O_3$ | — | — | — | 1.92 | — | — |
|  | ZnO | 6.00 | 6.00 | 6.00 | — | — | — |
|  | $Li_2O$ | 4.10 | 4.10 | 4.10 | — | 8.68 | 14.12 |
|  | $Na_2O$ | 8.53 | 8.53 | 8.53 | 17.22 | 0.47 | 7.09 |
|  | $K_2O$ | 3.69 | 3.69 | 3.69 | 1.42 | 0.31 | — |
|  | MgO | — | — | — | 1.66 | — | — |
|  | CaO | — | — | — | 2.38 | — | — |
|  | BaO | — | — | — | — | 0.64 | — |
|  | $ZrO_2$ | — | — | — | 2.71 | 1.07 | — |
|  | $P_2O_5$ | — | — | — | — | 0.70 | — |
|  | $SnO_2$ | 0.11 | — | 0.07 | 0.04 | — | — |
|  | $CeO_2$ | — | — | 0.02 | — | — | — |
|  | $Sb_2O_3$ | — | — | — | — | 0.11 | 0.10 |
|  | $TiO_2$ | 1.69 | 1.69 | 1.69 | 3.76 | 1.65 | — |
|  | Cl | — | 0.11 | 0.02 | — | — | — |
| $R_2O + Al_2O_3$ | | 24.8 | 24.8 | 24.8 | 27.1 | 23.4 | 25.1 |
| $R_2O/Al_2O_3$ | | 1.93 | 1.93 | 1.93 | 2.19 | 0.64 | 5.51 |
| Density (g/cm³) | | 2.54 | 2.53 | 2.53 | 2.59 | 2.42 | 2.38 |
| Strain point Ps (° C.) | | 485 | 489 | 484 | 552 | 670 | 315 |
| Annealing point Ta (° C.) | | 528 | 532 | 527 | 591 | 725 | 346 |
| Softening point Ts (° C.) | | 741 | 745 | 740 | 775 | — | 504 |
| $10^4$ dPa·s (° C.) | | 1126 | 1130 | 1125 | 1091 | 1348 | 870 |
| $10^3$ dPa·s (° C.) | | 1337 | 1341 | 1336 | 1260 | 1533 | 1091 |
| $10^{2.5}$ dPa·s (° C.) | | 1473 | 1477 | 1472 | 1372 | 1647 | 1248 |
| Thermal expansion coefficient α ($\times 10^{-7}$/° C.) | | 88 | 88 | 95 | 44 | 87 | |
| Liquidus temperature (° C.) | | Not measured | Not measured | Not measured | 870 | >1350 | <800 |
| Liquidus viscosity (dPa·s) | | Not measured | Not measured | Not measured | 6.2 | <3.9 | >4.4 |
| Young's modulus (GPa) | | Not measured | Not measured | Not measured | Not measured | 81 | Not measured |
| Specific modulus (GPa/(g/cm³)) | | Not measured | Not measured | Not measured | Not measured | 33 | Not measured |
| Crack generation ratio (%) | | Not measured | Not measured | Not measured | Not measured | 0 | Not measured |
| Compression stress (MPa) | | Not measured | Not measured | Not measured | 1330 | No stress layer | No stress layer |
| Depth of stress layer (μm) | | Not measured | Not measured | Not measured | 11 | No stress layer | No stress layer |

Each of the samples was produced as described below. First, a glass raw material was prepared so as to have a glass composition shown in Tables 1 to 7, and the raw material was melted at 1,600° C. for 8 hours using a platinum pot. Thereafter, the molten glass was cast on a carbon plate and formed into a plate shape. Various properties were evaluated for the resultant glass plate.

The density was measured by a known Archimedes method.

The strain point Ps and the annealing point Ta were measured based on a method of ASTM C336.

The softening point Ts was measured based on a method of ASTM C338.

Temperatures at glass viscosities $10^{4.0}$ dPa·s, $10^{3.0}$ dPa·s, and $10^{2.5}$ dPa·s were measured by a platinum sphere lifting method.

The thermal expansion coefficient α is an average thermal expansion coefficient measured in the range of 30 to 380° C. using a dilatometer.

As for the liquidus temperature: a glass was ground, and a glass powder which passes through a standard sieve of 30 mesh (mesh opening 500 μm) and remaining on 50 mesh (mesh opening 300 μm) was placed in a platinum boat, kept in a temperature gradient furnace for 24 hours, then, the crystal thereof deposited, and the temperature at this stage was referred to as liquidus temperature.

The crack generation ratio was measured as described below. First, in a constant-temperature constant-humidity chamber kept at a humidity of 30% and a temperature of 25° C., a Vickers indenter set at a load of 500 g was allowed to beat the glass surface (optically polished surface) for 15 seconds, and after 15 seconds, the number of cracks generated from four corners of the impression was counted (at maximum 4 for one impression). The indenter was allowed to beat 20 times as described above, and the total crack generation number was determined, then, the crack generation ratio was calculated by the formula: (total crack generation number/80)×100.

The Young's modulus was measured by a resonance method.

As a result, the glass substrates of Nos. 1 to 46 each had the density of 2.6 g/cm³ or less, the Young's modulus of 71 GPa or more, and the specific Young's modulus of 29.5 GPa/(g/cm³) or more, had light weight, and did not bend easily. Further, the glass substrates of Nos. 1 to 46 each had the thermal expansion coefficient of 43 to 95×10⁻⁷/° C., and hence showing matching of the thermal expansion coefficient with those of peripheral materials, and had the crack generation ratio of 30% or less, and hence, the glass is not easily broken. Further, the glass of Nos. 1 to 46 each had the liquidus temperature of as high as $10^{4.0}$ dPa·s or more, and thus the glass is capable of being formed by the overflow down-draw method, and in addition, the glass had the temperature at $10^{2.5}$ dPa·s of as low as 1700° C. or lower, thus, it is believed there can be supplied a large amount of glass substrates at low cost. Note that the untempered glass substrate and tempered glass substrate are not substantially different in glass composition as the whole glass substrate, even though the glass compositions thereof are microscopically different on the surface of the glass substrate. Therefore, for property values such as density, viscosity, and Young's modulus, the untempered glass substrate and the tempered glass substrate are not substantially different. Note that the untempered glass substrate and the tempered glass substrate are different in the property values in some cases, because the crack generation ratio is influenced by the composition of the glass surface layer, but the crack generation ratio tends to be lower in the tempered glass substrate, thus, the crack generation ratio is not a factor for decreasing the strength in the present invention.

On the other hand, it is supposed that the sample of Comparative Example No. 47 is not formed easily by an overflow down-draw method, because the sample had the liquidus temperature of 1350° C. or higher and had a low liquidus viscosity.

Subsequently, the both surfaces of each of the glass substrates were subjected to optical polishing, then, an ion exchange treatment was performed. The ion exchange treatment was performed by immersing each sample in a $KNO_3$ molten salt at 430° C. for 4 hours. The surface of the sample after the treatment was washed, then, the surface compression value and the depth of compression stress layer were calculated from the number of interference stripes and clearance thereof observed using a surface stress meter (FSM-6000 manufactured by Toshiba Corporation).

As a result, the samples of Nos. 1 to 46, which are examples of the present invention, each had a compression stress of 200 MPa or more generated on the surface thereof, and had the depth of 9 µm or more.

On the other hand, the samples of Comparative Examples Nos. 47 and 48, the presence of a compression stress layer could not be confirmed even after the ion exchange treatment.

Note that, in the above-mentioned examples, a glass was melted, formed by casting, and then optically polished before the ion exchange treatment, for convenience of explanation of the present invention. In the case of production in industrial scale, it is preferred that a glass substrate be formed by an overflow down-draw method and the like, and an ion exchange treatment be carried out in the state that the both surfaces of the glass substrate are unpolished.

Industrial Applicability

The tempered glass substrate of the present invention is suitable as a cover glass or a touch panel display substrate for cellular phones, digital cameras, and PDA. The tempered glass substrate of the present invention is expected to be applied to applications requiring high mechanical strength, for example, window glasses, magnetic disk substrates, flat panel display substrates, solar battery cover glasses, solid-state imaging device cover glasses, and tableware, in addition to the above-mentioned applications.

The invention claimed is:

1. A tempered glass substrate, comprising a compression stress layer on a plane surface thereof,
    wherein the tempered glass substrate has a glass composition comprising, in terms of mole %, 50 to 85% of $SiO_2$, 5 to 30% of $Al_2O_3$, 0 to 20% of $Li_2O$, 7 to 20% of $Na_2O$, 0 to 4% of $K_2O$, 0.001 to 10% of $TiO_2$, 0 to 0.1% of $ZrO_2$, 0 to 1% of CaO, and 15 to 35% of $Li_2O+Na_2O+K_2O+Al_2O_3$, has a $(Li_2O+Na_2O+K_2O)/Al_2O_3$ value of 0.7 to 3 in terms of mole fraction, a $K_2O/(Li_2O+Na_2O+K_2O)$ value of 0 to 0.11 in terms of mole fraction, and is substantially free of $As_2O_3$ and F.

2. The tempered glass substrate according to claim 1, wherein the tempered glass substrate has a glass composition comprising, in terms of mole %, 50 to 85% of $SiO_2$, 5 to 12.5% of $Al_2O_3$, 0 to 7% of $B_2O_3$, 0 to 9% of $Li_2O$, 7 to 20% of $Na_2O$, 0 to 4% of $K_2O$, 0.001 to 8% of $TiO_2$, 0 to 0.1% of $ZrO_2$, 0 to 1% of CaO, and 15 to 35% of $Li_2O+Na_2O+K_2O+Al_2O_3$, has a $(Li_2O+Na_2O+K_2O)/Al_2O_3$ value of 0.7 to 2.7 in terms of mole fraction, a $(MgO+CaO)/Al_2O_3$ value of 0 to 0.55 in terms of mole fraction, a $K_2O/(Li_2O+Na_2O+K_2O)$ value of 0 to 0.11 in terms of mole fraction, and is substantially free of $As_2O_3$ and F.

3. The tempered glass substrate according to claim 1, wherein a compression stress of the plane surface is 100 MPa or more and a depth of the compression stress layer is 1 µm or more.

4. The tempered glass substrate according to claim 1, wherein the plane surface is an unpolished surface.

5. The tempered glass substrate according to claim 1, wherein the tempered glass substrate is formed by an overflow down-draw method.

6. The tempered glass substrate according to claim 1, wherein the tempered glass substrate has a liquidus temperature of 1300° C. or lower.

7. The tempered glass substrate according to claim 1, wherein the tempered glass substrate has a liquidus viscosity of $10^{4.0}$ dPa·s or more.

8. The tempered glass substrate according to claim 1, wherein the tempered glass substrate is cut after forming the compression stress layer by an ion exchange.

9. The tempered glass substrate according to claim 1, wherein the tempered glass substrate has a liquidus viscosity of $10^{5.0}$ dPa·s or more.

10. The tempered glass substrate according to claim 1, wherein the tempered glass has a thermal expansion coefficient at 30 to 380° C. of 40 to $95 \times 10^{-7}/°$ C.

11. The tempered glass substrate according to claim 1, wherein the tempered glass has a crack generation ratio of 60% or less.

12. The tempered glass substrate according to claim 1, which is used as a touch panel display.

13. A tempered glass substrate, comprising a compression stress layer on a plane surface thereof,
    wherein the tempered glass substrate has a glass composition comprising, in terms of mole %, 50 to 85% of $SiO_2$, 5 to 30% of $Al_2O_3$, 0 to 7% of $B_2O_3$, 0.5 to 20% of $Li_2O$, 7 to 20% of $Na_2O$, 0 to 4% of $K_2O$, 0.001 to 10% of $TiO_2$, 0 to 0.1% of $ZrO_2$, 0 to 1% of CaO, and 15 to 35% of $Li_2O+Na_2O+K_2O+Al_2O_3$, and has a $(Li_2O+Na_2O+K_2O)/Al_2O_3$ value of 0.7 to 3 in terms of mole fraction, and a $K_2O/(Li_2O+Na_2O+K_2O)$ value of 0 to 0.11 in terms of mole fraction.

14. The tempered glass substrate according to claim 13, wherein the tempered glass substrate has a glass composition comprising, in terms of mole %, 50 to 85% of $SiO_2$, 5 to 12.5% of $Al_2O_3$, 0 to 7% of $B_2O_3$, 0.5 to 10% of $Li_2O$, 7 to 20% of $Na_2O$, 0 to 4% of $K_2O$, 0.01 to 10% of $TiO_2$, 0 to 0.1% of $ZrO_2$, 0 to 1% of CaO, and 15 to 28.5% of $Li_2O+Na_2O+K_2O+Al_2O_3$, and has a $(Li_2O+Na_2O+K_2O)/Al_2O_3$ value of 0.7 to 2.7 in terms of mole fraction, and a $K_2O/(Li_2O+Na_2O+K_2O)$ value of 0 to 0.11 in terms of mole fraction.

15. The tempered glass substrate according to claim 13, wherein a compression stress of the surface is 100 MPa or more and a depth of the compression stress layer is 1 µm or more.

16. The tempered glass substrate according to claim 13, wherein the plane surface is an unpolished surface.

17. The tempered glass substrate according to claim 13, wherein the tempered glass substrate is formed by an overflow down-draw method.

18. The tempered glass substrate according to claim 13, wherein the tempered glass substrate has a liquidus temperature of 1300° C. or lower.

19. The tempered glass substrate according to claim 13, wherein the tempered glass substrate has a liquidus viscosity of $10^{4.0}$ dPa·s or more.

20. The tempered glass substrate according to claim 13, wherein the tempered glass substrate is cut after forming the compression stress layer by an ion exchange.

21. The tempered glass substrate according to claim 13, wherein the tempered glass substrate has a liquidus viscosity of $10^{5.0}$ dPa·s or more.

22. The tempered glass substrate according to claim 13, wherein the tempered glass has a thermal expansion coefficient at 30 to 380° C. of 40 to $95 \times 10^{-7}$/° C.

23. The tempered glass substrate according to claim 13, wherein the tempered glass has a crack generation ratio of 60% or less.

24. The tempered glass substrate according to claim 13, which is used as a touch panel display.

25. A tempered glass, which has a glass composition comprising, in terms of mole %, 50 to 85% of $SiO_2$, 5 to 30% of $Al_2O_3$, 0 to 20% of $Li_2O$, 7 to 20% of $Na_2O$, 0 to 4% of $K_2O$, 0.001 to 10% of $TiO_2$, 0 to 0.1% of $ZrO_2$, 0 to 1% of CaO, and 15 to 35% of $Li_2O+Na_2O+K_2O+Al_2O_3$, has a $(Li_2O+Na_2O+K_2O)/Al_2O_3$ value of 0.7 to 3 in terms of mole fraction, a $K_2O/(Li_2O+Na_2O+K_2O)$ value of 0 to 0.11 in terms of mole fraction, is substantially free of $As_2O_3$ and F, and has a compression stress layer formed on a plane surface.

26. A tempered glass, which has a glass composition comprising, in terms of mole %, 50 to 85% of $SiO_2$, 5 to 30% of $Al_2O_3$, 0 to 7% of $B_2O_3$, 0.5 to 20% of $Li_2O$, 7 to 20% of $Na_2O$, 0 to 4% of $K_2O$, 0.001 to 10% of $TiO_2$, 0 to 0.1% of $ZrO_2$, and 15 to 35% of $Li_2O+Na_2O+K_2O+Al_2O_3$, has a $(Li_2O+Na_2O+K_2O)/Al_2O_3$ value of 0.7 to 3 in terms of mole fraction, a $K_2O/(Li_2O+Na_2O+K_2O)$ value of 0 to 0.11 in terms of mole fraction, and has a compression stress layer formed on a plane surface.

27. A glass, which has a glass composition comprising, in terms of mole %, 50 to 85% of $SiO_2$, 5 to 30% of $Al_2O_3$, 0 to 20% of $Li_2O$, 7 to 20% of $Na_2O$, 0 to 4% of $K_2O$, 0.001 to 10% of $TiO_2$, 0 to 0.1% of $ZrO_2$, 0 to 1% of CaO, and 15 to 35% of $Li_2O+Na_2O+K_2O+Al_2O_3$, has a $(Li_2O+Na_2O+K_2O)/Al_2O_3$ value of 0.7 to 3 in terms of mole fraction, a $K_2O/(Li_2O+Na_2O+K_2O)$ value of 0 to 0.11 in terms of mole fraction, and is substantially free of $As_2O_3$ and F.

28. A glass according to claim 27, which has, when ion exchange is carried out in a $KNO_3$ molten salt at 430° C. for 4 hours, a compression stress of a surface of 200 MPa or more and a depth of compression stress layer of 3 μm or more.

29. A glass, which has a glass composition comprising, in terms of mole %, 50 to 85% of $SiO_2$, 5 to 30% of $Al_2O_3$, 0 to 7% of $B_2O_3$, 0.5 to 20% of $Li_2O$, 7 to 20% of $Na_2O$, 0 to 4% of $K_2O$, 0.001 to 10% of $TiO_2$, 0 to 0.1% of $ZrO_2$, 0 to 1% of CaO, and 15 to 35% of $Li_2O+Na_2O+K_2O+Al_2O_3$, and has a $(Li_2O+Na_2O+K_2O)/Al_2O_3$ value of 0.7 to 3 in terms of mole fraction and a $K_2O/(Li_2O+Na_2O+K_2O)$ value of 0 to 0.11 in terms of mole fraction.

30. The glass according to claim 29, wherein when an ion exchange is carried out in a $KNO_3$ molten salt at 430° C. for 4 hours, the glass has a compression stress of the compression stress layer of 200 MPa or more and a depth of the compression stress layer of 3 μm or more.

\* \* \* \* \*